H. GIBBS.
MACHINE FOR FORMING HOSE BANDS.
APPLICATION FILED OCT. 4, 1913.
1,175,517. Patented Mar. 14, 1916.
8 SHEETS—SHEET 3.
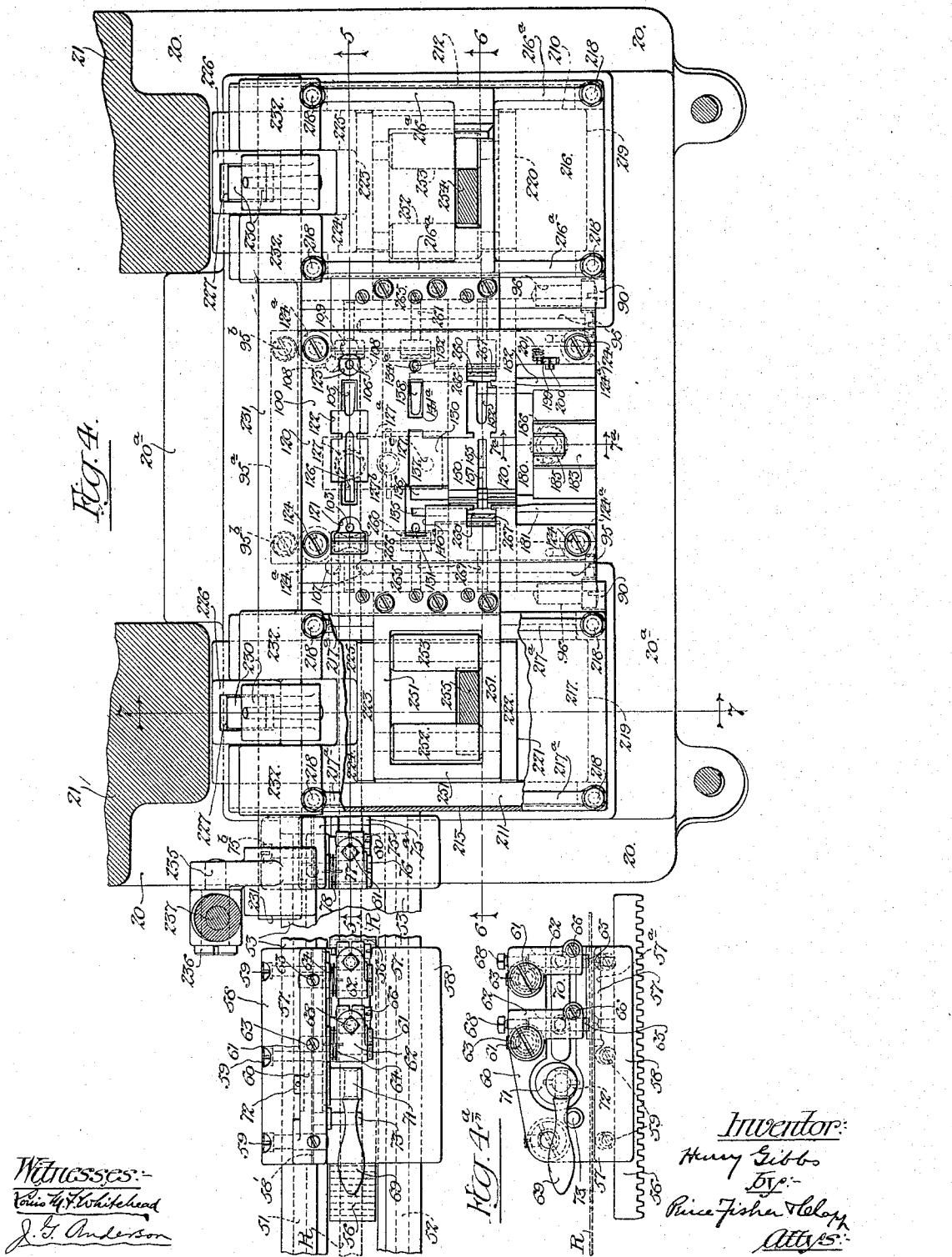

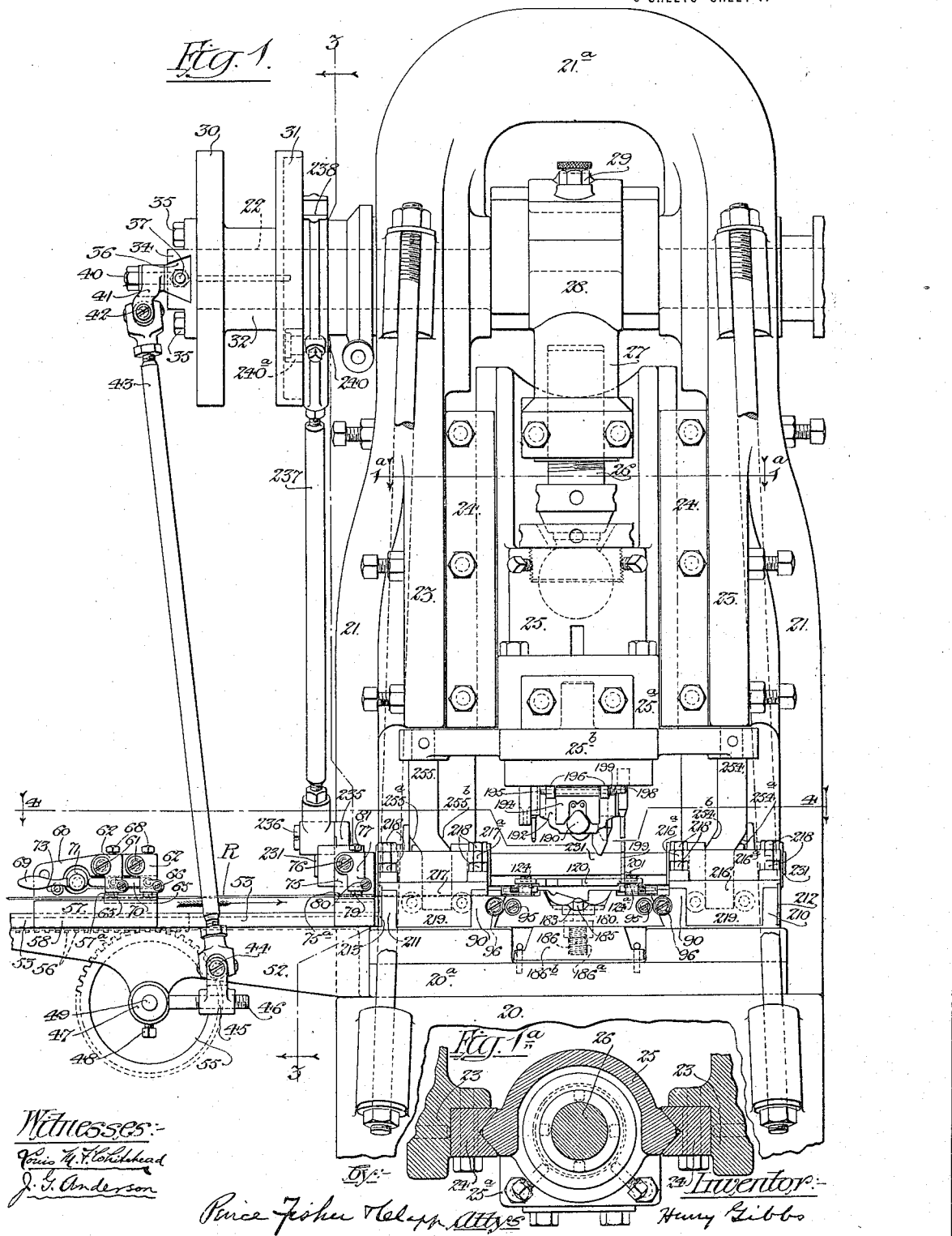

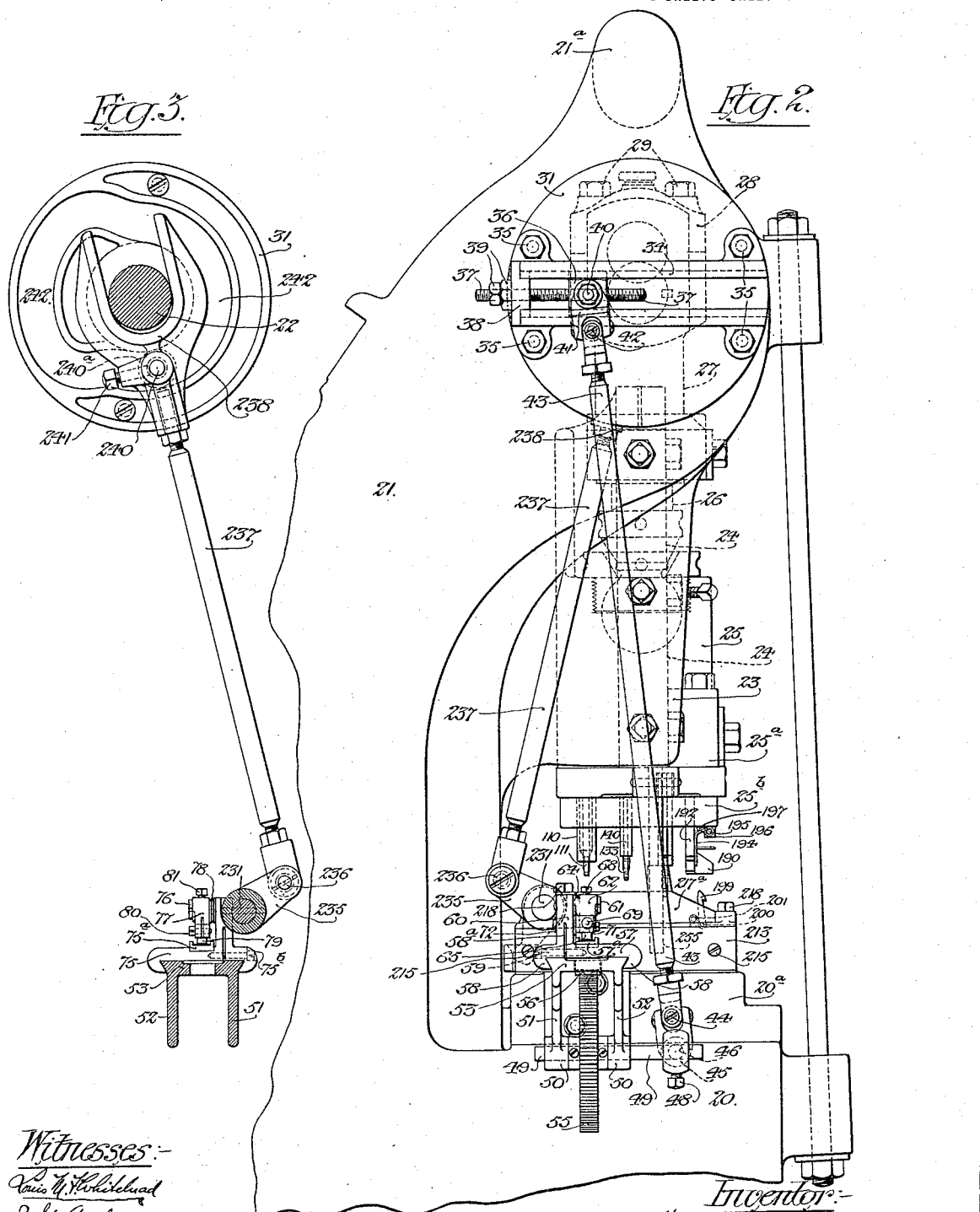

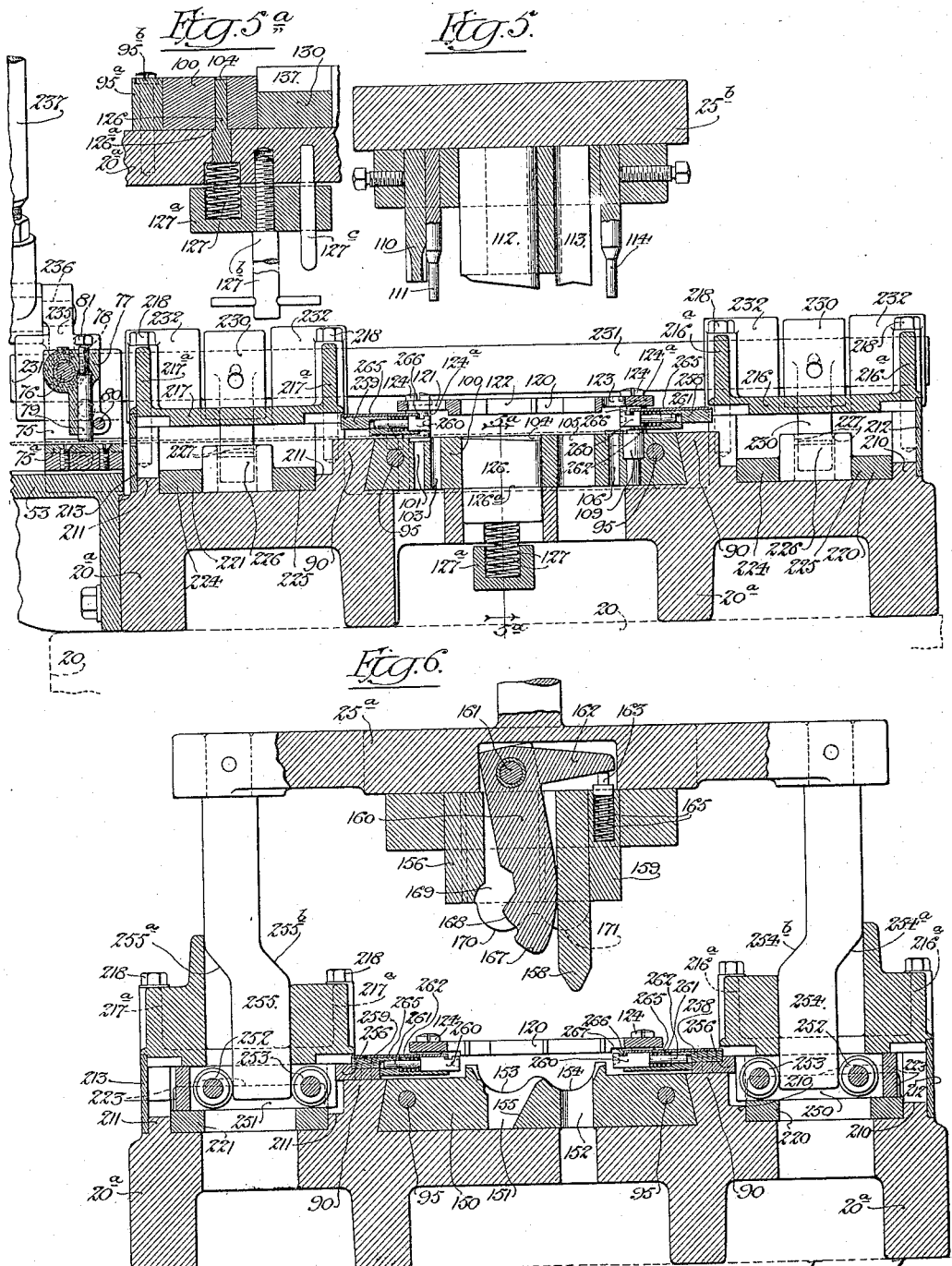

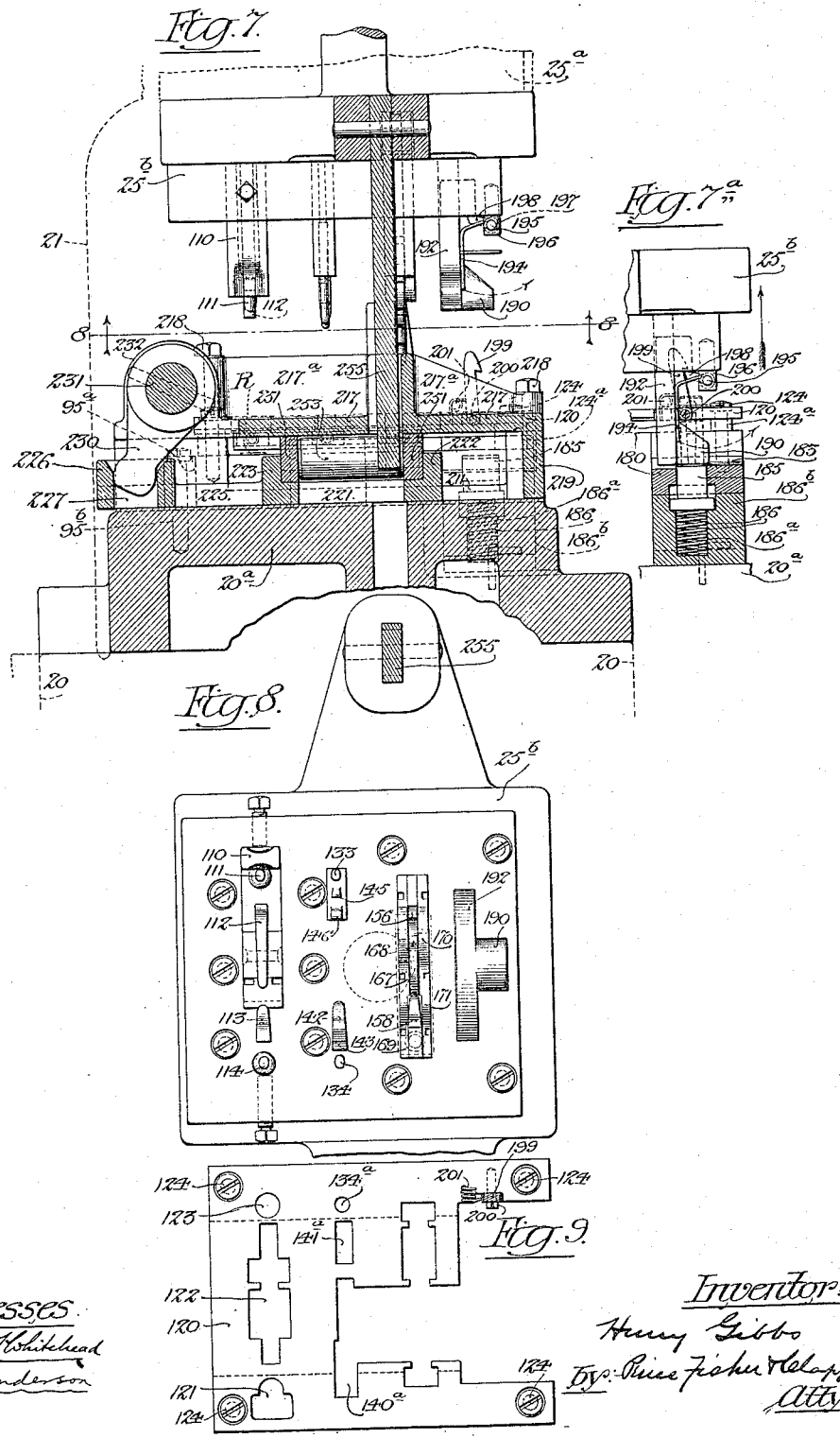

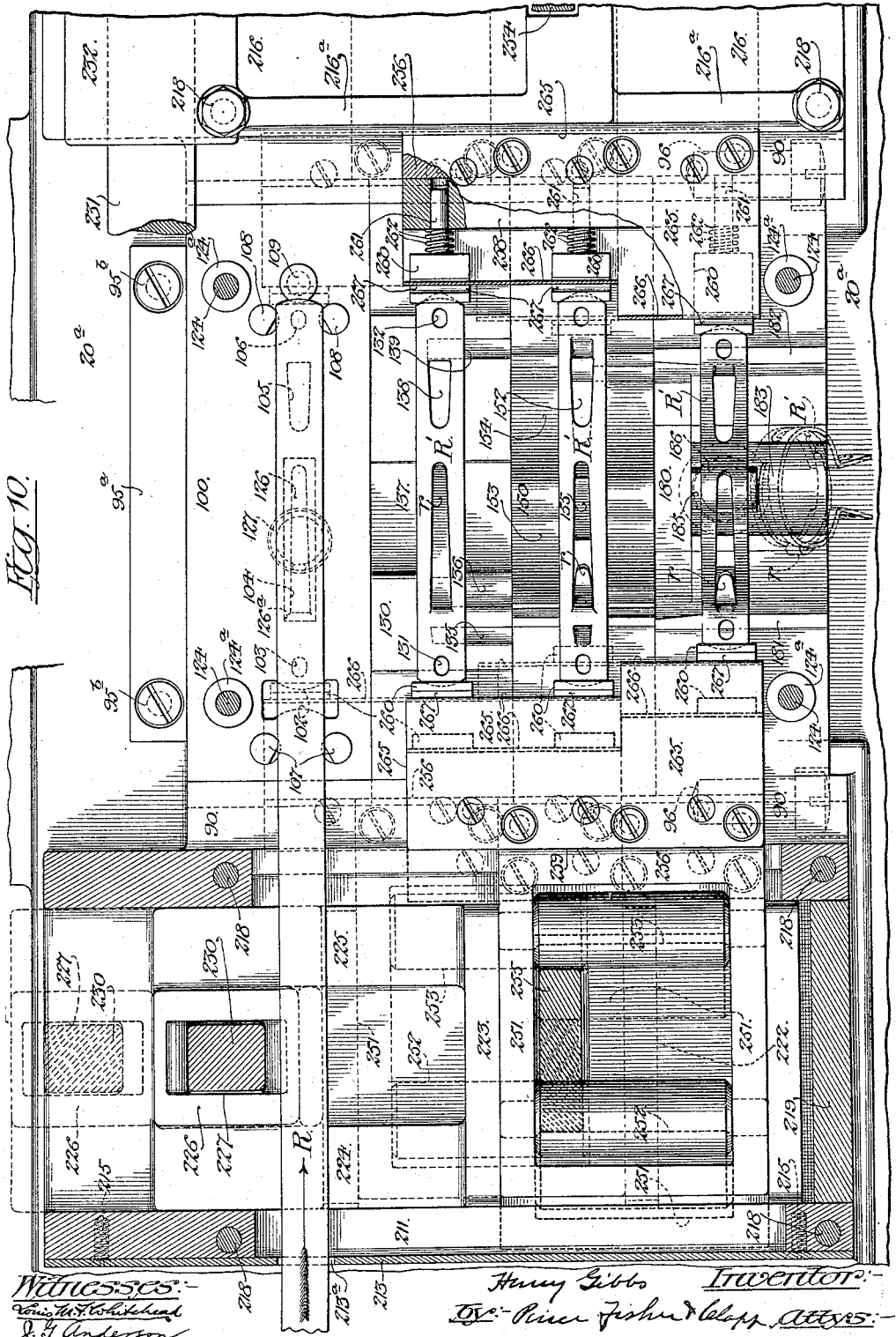

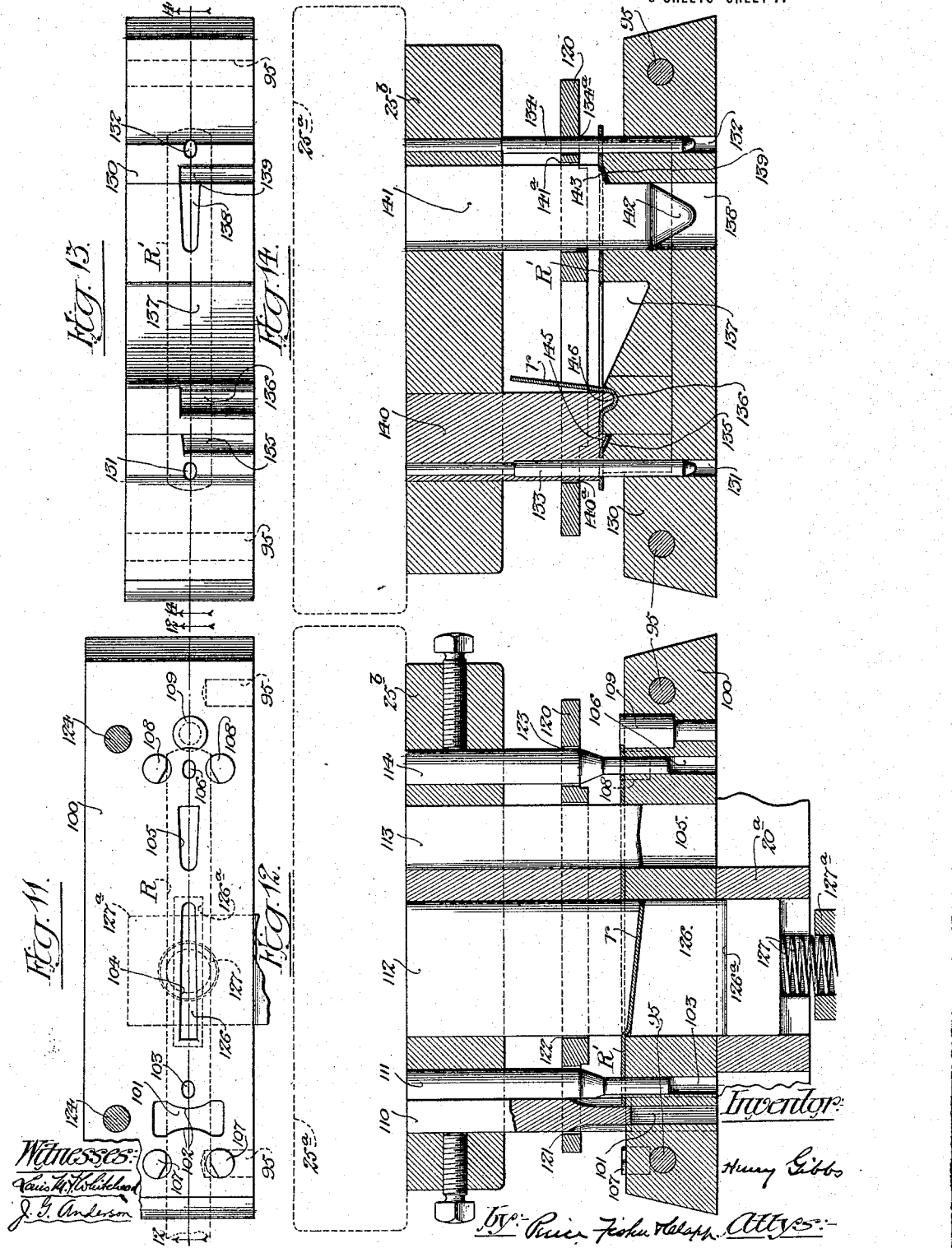

H. GIBBS.
MACHINE FOR FORMING HOSE BANDS.
APPLICATION FILED OCT. 4, 1913.
1,175,517.
Patented Mar. 14, 1916.
8 SHEETS—SHEET 8.
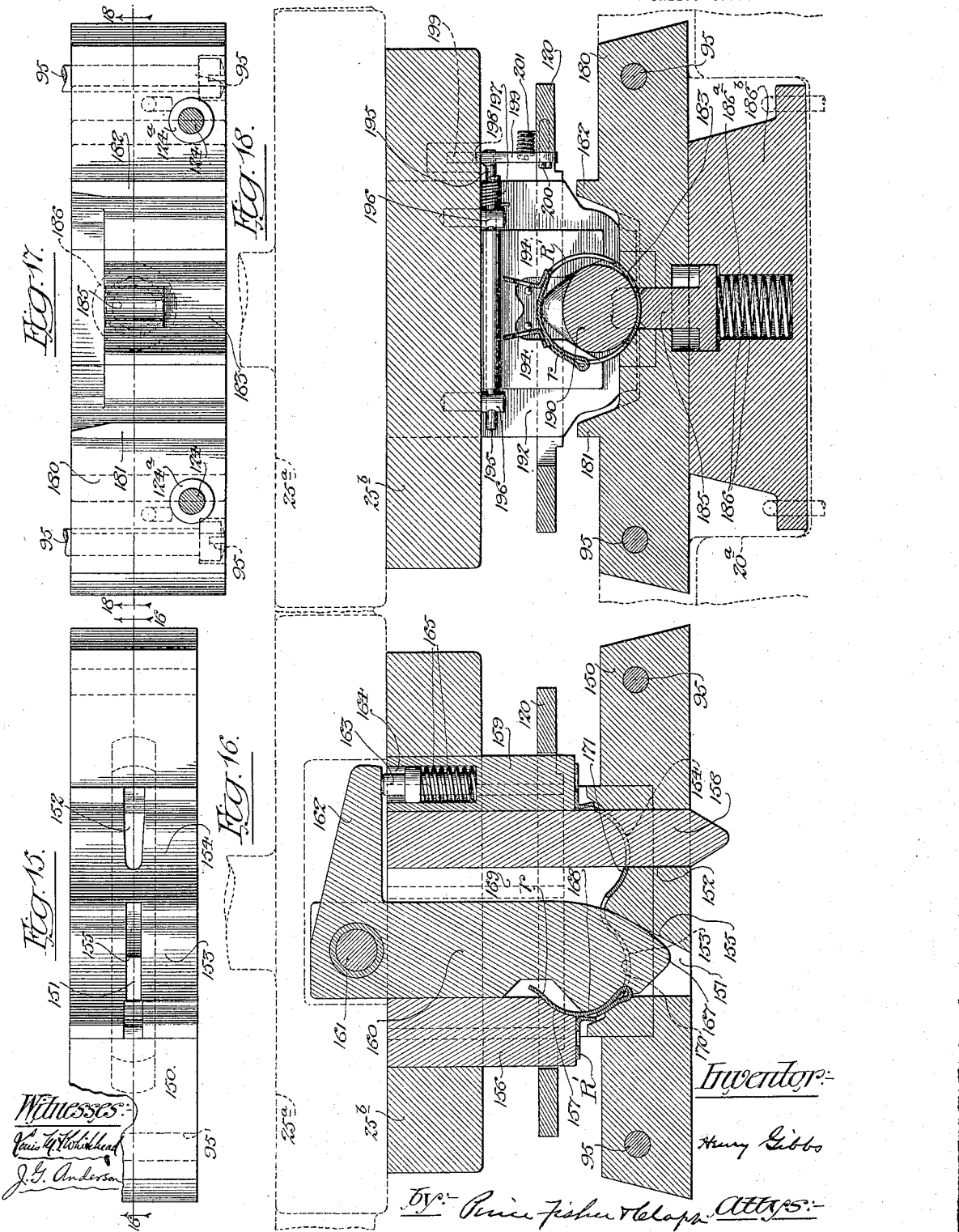

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION OF ILLINOIS.

MACHINE FOR FORMING HOSE-BANDS.

1,175,517.  Specification of Letters Patent.  Patented Mar. 14, 1916.

Application filed October 4, 1913. Serial No. 793,284.

*To all whom it may concern:*

Be it known that I, HENRY GIBBS, a citizen of the United States, residing at Chicago, in the county of Cook and State of Illinois, have invented certain new and useful Improvements in Machines for Forming Hose-Bands, of which I do declare the following to be a full, clear, and exact description, reference being had to the accompanying drawings, forming a part of this specification.

Figure 1 is a view in front elevation of a machine embodying my invention. Fig. 1$^a$ is a view in horizontal section on the line 1$^a$—1$^a$ of Fig. 1. Fig. 2 is an end view. Fig. 3 is a view in vertical section on line 3—3 of Fig. 1. Fig. 4 is a view in horizontal section on the line 4—4 of Fig. 1. Fig. 4$^a$ is a view in front elevation of the feed mechanism shown at the left-hand side of Fig. 4. Fig. 5 is a view in vertical section on line 5—5 of Fig. 4. Fig. 5$^a$ is a detail view in vertical section on line 5$^a$—5$^a$ of Fig. 5. Fig. 6 is a view in vertical section on line 6—6 of Fig. 4. Fig. 7 is a view in vertical section on line 7—7 of Fig. 4. Fig. 7$^a$ is a detail view partly in section on line 7$^a$—7$^a$ of Fig. 4, parts being shown in elevation. Fig. 8 is an inverted plan view of the female dies at the end of the plunger on line 8—8 of Fig. 7. Fig. 9 is a detail view of the stripper plate. Fig. 10 is a plan view of the lower die mechanism and associated parts, certain parts being shown in section. Fig. 11 is a detailed plan view showing the first of the female dies. Fig. 12 is a view in vertical section on the line 12—12 of Fig. 11, this section showing also the male dies. Fig. 13 is a detail plan view showing the second female die. Fig. 14 is a view in vertical section on line 14—14 of Fig. 13, the corresponding male dies being also shown. Fig. 15 is a detail plan view of the third female die. Fig. 16 is a view in vertical section on line 16—16 of Fig. 15, the corresponding male dies being shown. Fig. 17 is a detail plan view of the finishing die. Fig. 18 is a view in vertical section on the line 18—18 of Fig. 17, parts coöperating with the finishing die being also shown.

The machine constituting my present invention is primarily designed for the forming of sheet metal hose bands, such as are used for attaching sections of rubber hose to nozzles or couplings; but features of my invention will be found applicable in the formation of similar articles.

The object of the invention is to provide a machine in which hose bands may be formed from a long strip of metal that will be fed into the machine and will be cut into lengths that will be punched and shaped by a series of dies to produce a finished band.

The invention consists in the various novel combinations of mechanism hereinafter described, illustrated in the accompanying drawings and particularly pointed out in the claims at the end of this specification.

The frame of my machine, which may be of any usual or suitable construction, is shown as comprising a lower or bed portion 20 on which is secured a stepped casting 20$^a$ and from which rises standards 21 connected at their tops as at 21$^a$. In the upper portion of the standards 21 is journaled the main shaft 22 that will be driven in the usual manner from a suitable source of power. Within the side portions 23 of the standard 21 and between the vertical guides 24 is mounted a vertically sliding plunger 25, the upper portion of which is of semi-cylindrical outline (see Fig. 1$^a$). This plunger 25 is connected by a threaded stem 26 having a ball and socket joint at its lower end with the threaded extension 27 of a yoke 28 that engages a crank portion of the main shaft 22, the yoke 28 being formed of sections united together by the screw bolts 29. The features above described are common in metal presses and form no part of the present invention.

On one end of the main shaft 22 is mounted a pair of disks or plates 30 and 31 preferably connected together by a hub 32 that is keyed to the shaft 22. The plate 30 is designed to impart motion to the mechanism for feeding the metal strip from which the hose bands will be formed, and the outer face of this plate 30 is provided with a guide 34 preferably bolted thereto, as at 35. In this guide 34, which is shown as of dovetailed shape, is mounted a sliding block 36 that is adjustable lengthwise of the guide, preferably by means of a screw 37 passing through a threaded opening in the block 36 and through an end plate 38 secured to the guide 34, the outer portion of the screw 37 being furnished with suitable adjustable and lock nuts 39 as shown, (see Figs. 1 and 2). From the block 36 projects outwardly a wrist pin 40 on which is pivotally mounted an arm 41 that is connected by a suitable universal joint 42 to the upper end of a rod 43, and the lower end of this rod 43 is connected by a universal joint 44 to a block 45 that is formed with a threaded opening to engage the threaded portion of a rod 46. The inner end of this rod 46 is fastened to a collar 47 that is secured, as by a set screw 48, to a shaft 49 journaled, as at 50 (see Figs. 1 and 2) in the depending walls 51 and 52 of a feed table or extension 53 that is suitably connected to the bed 20 of the main frame. Upon the shaft 49 is fixed a pinion 55 that engages a rack bar 56 that depends from the under side of a feed plate 57, whereby will be supported, feeding pawls for advancing the strip from which the hose bands are to be formed. The upper wall of the feed table 53 will be slotted where the rack bar 56 passes therethrough and the feed plate 57 will preferably be connected to the feed table 53 by flanged edges 58, as clearly shown in Fig. 2 of the drawings. The feed table 57 is preferably formed with a slot 58' running from end to end thereof, and the divided portions of the feed plate are connected by set screws 59 (see Fig. 3) which enable the tension of the flanges 58, with respect to the feed table 53, to be adjusted. From the feed plate 57 rises a wall 60 from which project the screw bolts 61 on which are pivotally mounted the pawl carriers 62.

By reference more particularly to Fig. 4, it will be seen that each of the bolts 61 has a reduced inner portion that sets within an opening in the wall 60 and is held in position therein by means of a screw 63 that is threaded into said wall and engages the reduced end portion of the screw 61. Upon each of the screw bolts or studs 61 is placed a coiled spring 64, one end of each of these coiled springs 64 being connected to the corresponding pawl carrier 62, while the opposite end of the spring is connected to the wall 60, so that the coiled springs serve to hold the pawl carriers 62 in a vertical position, as shown in Fig. 4ª of the drawings. Each of the pawl carriers 62 has a vertical opening formed therethrough to receive the stem of a feed pawl 65, and the lower portions of the pawl carriers 62 are split and provided with flanges through which pass clamp screws 66 that serve to retain the pawls 65 in the pawl carriers. In the top of each pawl carrier is formed a threaded hole through which passes an adjusting screw 68, the lower end of which will bear against the upper end of the corresponding pawl 65 and by means of the screw 68, the vertical position of the pawls can be adjusted. The pawl carriers 62 are connected together by a link 70, to secure their unison movement, this link being connected by suitable pins or bolts to each of the pawl carriers, as indicated by dotted lines in Fig. 4ª of the drawings. The rear end of the link 70 is in position to be engaged by a cam 71, the stem 72 of which passes through the wall 60, and to this cam is connected a handle 69 whereby the cam 71 may be shifted. A stub 73 projects from the wall 60 and limits the downward movement of the handle 72. The pawls 65 and the pawl carriers 62 will normally stand in the position shown in Fig. 4ª in the drawings and will rest upon the upper surface of the metal strip R from which the hose coupling blanks are to be formed, but when it is desired to release the pawls 65 in order to withdraw the strip R from engagement therewith, the handle 72 may be turned upward and the cam 71 will then force forward the link 70 and cause the pawl carriers 62 and pawl 65 to be lifted away from the strip R.

At the left hand side of the main frame 20 (see Figs. 1, 4 and 5) is mounted a block 75 having a guide plate 75ª and from the vertical member of block 75 projects a screw bolt or stud 76 on which is pivotally mounted a dogging pawl carrier 77, the construction of which is similar to the pawl carriers 62 hereinbefore described. This dogging pawl carrier 77 is held normally in vertical position by means of a coiled spring 78, one end of which is fastened to the vertical member of the block or plate 75, while the other end of this spring is connected to the dogging pawl carrier 77. The dog or pawl 79 within the carrier 77 is held in place by a clamping screw 80 (see Figs. 1 and 4) and is vertically adjustable by means of a set screw 81 that passes through a threaded hole in the top of the dogging pawl carrier 77. The purpose of the dog or pawl 79 is to prevent the backward movement of the metal strip R when the feeding carriage that sustains the feeding pawls 65 is moved backward to reëngage the strip R before again advancing said strip.

The metal strip R will pass from a reel or coil (not shown) in the direction of the arrow Fig. 1 over the feed plate 57, and the guide 57ª thereon beneath the pawls 65 and over the guide 75ª in the block or plate 75 beneath the dogging pawl 79, and thence into the machine.

From the construction of parts as thus far defined, the operation of the mechanism will be seen to be as follows: When revolution is imparted to the shaft 22, a reciprocating motion will be transmitted therefrom to the rod 43 and the movement of this rod 43 will impart a rocking motion to the arm 46 which, in turn, will rotate the pinion 55 and impart a reciprocating movement to the rack bar 56 and the feed plate 57 and pawls 65 carried thereby. As the feed plates 57 with the pawls 65 are thus moved forward, the pawls will engage the strip 49 and advance the strip R into the machine and beneath the dogging pawl 79, but as the feed plate 57 and feed pawls 65 are moved backward, the dogging pawl 79 will hold the strip R and prevent its backward movement.

The top of the stepped casting 20$^a$ of the machine is formed with raised ribs 90 (see Figs. 1, 4, 5 and 10) between which will be held the various female dies that will be used in forming the hose band, these several dies being preferably held together against a stop block 95$^a$ secured to the stepped casting 20$^a$ by means of bolts 95$^b$, as shown in Figs. 4, 5$^a$, 7 and 10, and being held in position with respect to the ribs 90 by means of the screws 96 shown by full lines in Fig. 1, and by dotted lines in Fig. 4, and other views of the drawings. When my improved apparatus is used in forming hose bands, the first operation will be that of severing from a continuous strip, a short strip or blank of proper length to form a band and at the time this short strip or blank is thus severed, an initial punching of the strip will be effected. This first operation of severing the short strip or blank and punching out parts thereof will be effected by the male and female dies. The dies for this first operation are illustrated in detail in Figs. 11 and 12 of the drawings. The female die 100 by which the severing of the short strip or blank from the continuous strip is effected, is located in line with the path of travel of the strip R (see Fig. 10), and on a line with or slightly below the level of the feed plate 57. As shown, the female die 100 is provided adjacent one end with a die opening 101, somewhat broader than the metal strip R, and preferably with oppositely curved edges 102, and adjacent this die opening 101 and centrally with respect thereto, is a small die opening 103. As shown, also, the die 100 is formed with an oblong die opening 104 and adjacent thereto is formed another oblong die opening 105, while near the opposite end of the die 100 is formed a small die opening 106. From the upper surface of the die 100 rise the guide pins 107 and 108 which guide the strip R and the stop pin 109 that limits the longitudinal movement of the strip (see Figs. 11 and 12).

Above the die 100 and suitably secured to the head 25$^b$ of the plunger 25 is mounted a set of male dies that coöperate with the female die 100. By reference more particularly to Fig. 12 of the drawings it will be seen that this set of male dies comprises the dies or punches 110, 111, 112, 113 and 114, that coöperate respectively with the die opening 101, 103, 104, 105 and 106 of the female die 100. The die or punch 110 and the die opening 101 serves to sever the short strip or blank R' (see Fig. 12) from the continuous strip R, the die 111 and die opening 103 and the die 114 and die opening 106 serves to punch holes adjacent the ends of this short strip or blank R', and the die or punch 113 and the die opening 105 enable an oblong hole to be formed in the short strip or blank R'. The lower end of the male die or punch 112 is beveled, as shown in Fig. 12, so that while the right hand portion of this punch or male die 112 shall cut the short strip or blank R', the left hand or vanishing portion of this male die or punch 112 will not sever the strip, but will leave the partially severed portion $r$ to form a tongue integral with and attached at one end to the body of the short strip or blank R'.

The several male dies or punches above described, pass through a stripper plate 120 (see Figs. 1, 7$^a$, 9 and 12), and through this same stripper plate pass all the male dies, as will presently more fully appear. The male dies or punches 110 and 111 pass through the opening 121 of the stripper plate (see Fig. 9), the dies or punches 112 and 113 pass through the long opening 122 of the stripper plate and the die or punch 114 passes through the opening 123 of the stripper plate. This stripper plate 120 is held at a distance above the upper surface of the male dies by means of spacing blocks 124$^a$ that are formed with openings to receive the screws 124 at the corners of the stripper plate (see Fig. 9). Preferably within the space 104 of the die plate 100 (see Figs. 5, 5$^a$, 11 and 12) there is placed a plunger 126 that has a shoulder 126$^a$ and is forced normally upward by a coiled spring 127. The lower end of the coiled spring 127 is held within the block 127$^a$ beneath the table 20, this block being adjustable by means of the screw 127$^b$, a guide pin 127$^c$ passing through a hole in the block (see Fig. 5$^a$). The upper face of this plunger 126 corresponds in shape to the lower end of the die or punch 112 and when the die or punch 112 is depressed and forces downward the tongue $r$ of the short strip or blank R' the plunger 126 will yield, but as the die or punch 112 recedes, the plunger 126 will be forced upward by the spring 127 and will move the tongue $r$ of the short strip or blank R' nearer the opening in the blank from which this tongue $r$ has been cut. The purpose of this plunger is to permit the tongue $r$ to be formed and partially bent upward, so that the short strip or blank R' may be moved laterally, as will presently more fully appear.

Adjacent the female die 100 by which the operation of severing a blank R' from the metal strip R and the preliminary punching of the blank R' are effected, is placed the second female die 130 (see Figs. 10, 13 and 14) by which the second operation upon the strip is effected, after the short strip or blank R' has been advanced laterally by mechanism to be hereinafter described. This female die 130 is shown as formed with openings 131 and 132 adjacent its ends to receive the guide rods 133 and 134 that project from the corresponding male die, these guide rods serving to accurately hold the short strip or blank R' in position, while it is being operated upon by the second set of dies. In the upper surface of the female die there are formed the cavities 135, 136, 137, the hole 138 and the cavity 139. The female die for the second operation upon the short strip or blank R' is shown as comprising a set of dies or punches 140 and 141. The lower end of the die or punch 140 has projections 145 and 146 adapted to enter the cavities 135 and 136. The lower end of the punch 141 is preferably pointed, as at 142, to enter the hole 138 of the female die 130 and this punch 141 is formed with a projection 143 (see Figs. 8 and 14) adapted to enter the cavity 139 of the female die 130. After the short strip or blank R' has been moved (as will presently appear) to the position above the female die 130, shown by dotted lines in Fig. 13, and the male die with its punches 140 and 141 is forced downward, the projections at the lower end of the punch 140 and the shoulder 143 of the punch 141 will coöperate with the female die in giving to the short strip or blank R' the shape shown in Fig. 14 of the drawings, and the cut-away space 137 of the die 130 enables the tongue r of the short strip or blank R' to be moved laterally to and from a position above the female die 130. The male punches or dies 140 and 141 pass through the openings 140ª and 141ª of the stripper plate (see Fig. 9), while the guide rod 134 passes through the opening 134ª of said stripper plate.

After the short strip or blank R' has been given the shape shown in Fig. 14, it will be moved laterally, by mechanism to be presently described, to the position shown by dotted lines in Fig. 15, above a female die 150 that is secured next to the female die 130 (see Figs. 10, 15 and 16 of the drawings). This female die 150 is formed with the openings 151 and 152, and in the upper portion of the female die 150 are formed the cavities 153 and 154. The opening 151 has one of its side walls downwardly inclined toward the opposite wall, for a purpose to be presently stated. The male die above the female die 150 is shown as comprising a member 156 having a curved portion 157 and as comprising also a guide rod 158 adapted to enter the hole 152 in the female die 150, and at the right hand side of this guide rod 158 is a member 159. Between the member 156 and the guide rod or plunger 158 is a movable male die member 160 that is pivoted upon a shaft 161 that has its ends mounted in the head of the plunger whereby the male dies are carried. This plunger is chambered, as shown in Fig. 16, to receive the upper end portion of the pivoted member 160 from which projects an arm 162. This arm 162 rests upon the upper end of a plunger 163 (see Figs. 6 and 16) that sets within a cavity 164 formed in the upper end of the member 159, the plunger being forced normally upward by the coiled spring 165 that encircles its lower end. The purpose of the spring actuated plunger 163 is to hold the pivoted member 160 normally in the retracted position shown in Fig. 6 of the drawings, but to yield in order to permit the pivoted member 160 to move to the position shown in Fig. 16. The lower end of the pivoted member 160 has a pointed portion 167 adapted to contact with the inclined wall 155 of the female die 150, and has also a laterally projecting portion 168 adapted to engage with the tongue r of the short strip or blank R' and bend this tongue r to the shape shown in Fig. 16 of the drawings. The members 156 and 159 of the male die are connected and preferably formed integral with the side portions 169, the lower portions of which are formed with the curved die faces 170 and 171 that coöperate respectively with the cavities 153 and 154 at the sides of the openings 151 and 152 of the female die. The pivoted member 160 and associated parts move through the corresponding openings formed in the stripper plate 120 (see Fig. 9) and when the pivot member 160 and associated parts are in the elevated or retracted position, the pivoted member will occupy the position shown in Fig. 6 of the drawings. While the pivoted member 160 is in the retracted position shown in Fig. 6, the short strip or blank R' to which has already been given the shape illustrated in Fig. 14 of the drawings, will be moved above the female die 150; then the pivoted member 160 and associated parts will be forced downward. In the downward movements of these parts, the pointed end of the guide rod or plunger 158 will first enter the slot beneath it in the short strip or blank R' and the pointed end 167 of the movable member 160 will enter the adjacent oblong slot in the short strip or blank R'. As the plunger descends, the end 167 of the movable member 160 will contact with the inclined wall 155 of the female die and this will force the lower end of the movable member 160 toward the left, causing it to bend the tongue r of the short strip or blank R' to the shape shown in Fig. 16 of the drawings, and to force the adjacent parts into the recesses of the cavity of the female die 150. As the plunger continues to descend, the curved projections 170 and 171 will compress the short strip or blank R' into the correspondingly curved recesses 153 and 154 of the female die 150, thus giving to the blank R′, the shape shown in Fig. 16.

After the plunger carrying the movable member 160 and other parts of the male die has been retracted, the short strip or blank R′ will be moved transversely (by mechanism to be presently described) over the final female die by which, together with the companion male die, the finished shape will be given to the blank R′ to form the finished hose band. This final female die 180 is best illustrated in detail in Figs. 8, 10, 17 and 18 of the drawings. It comprises raised ribs 181 and 182 between which is located a central circular cavity 183, the ribs 181 and 182 serving to temporarily support the ends of the short strip or blank R′ when it is fed to a position above the die 180. At the bottom of the die cavity 183 is formed an opening through which projects a plunger 185 having an upper end curved in conformity to the curvature of the cavity 183 and this plunger 185 rests upon a coiled spring 186 within a chamber 186ª found in the casting 186ᵇ held by pins exactly beneath the die 180 (see Fig. 18). The purpose of this plunger 185 is to lift the finished hose band from the cavity 183 of the die, so that the band may be easily ejected from the machine. The male member coöperating with the female die 180 consists of a die 190 (see Figs. 7, 8 and 18) that projects from the lower side of a plate 192 fastened in the plunger head 25ª. The upper surface of this male die 190 is inclined, as shown, to permit the finished hose band to be easily removed therefrom. When the short strip or blank, after having been formed to the shape shown in Fig. 16 of the drawings, has been moved over the female die 180 and above the plunger 185, the male die 190 will descend and bearing upon the center of the short strip or blank R′, will coöperate with the female die 180 in causing the end portions of this blank or strip to turn upward and inward until they occupy the position shown in Fig. 18 of the drawings, to form the finished hose band. After the hose band has thus been finished, and the plunger head 25ª is retracted, the plunger 185 (see Fig. 18) will cause the finished hose band to follow upward the male die 190, after which the finished hose band will be ejected by the mechanism next to be described. Against the outer face of the wall 192 from which the male die 190 projects (see Figs. 7 and 18) is mounted an ejector plate 194, the upper end of which is bent outwardly and is secured to a rod 195 that is pivoted in bearing pins 196 depending from the under side of the plunger head, as shown. One end of this shaft 195 is encircled by a coiled spring 197, the tension of which serves to hold the ejector plate 194 in the normal position shown in Figs. 7 and 18 of the drawings. To the end of the shaft 195 is connected the rear projected tripper arm 198 (see Figs. 7 and 7ª) adapted to be caught by a trigger 199 that is pivoted, as at 200 (see Fig. 18) to the stripper plate 120. To this trigger 199 is connected a spring 201, the opposite end of which is attached to the stripper plate 120 and this spring serves to hold the trigger 199 in the normal position shown in Fig. 7 of the drawings. As the male plunger 190 reaches the limit of its downward movement, the end of the trigger 199 will engage the free end of the tripper arm 198, the trigger 199 yielding slightly to permit this engagement and, as the male die 190 is retracted, the hooked end of the trigger 199 will, because of this engagement with the tripper arm 198, cause the ejector plate 194 to swing in the direction of the arrow, Fig. 7 and eject a finished hose band from the male die 190.

By reference to Fig. 10 of the drawings, it will be seen that the metal strip R from which the hose bands are to be formed, is fed into the machine in the direction of the arrow there shown. The feeding of this metal strip R is effected intermittently and as a short strip or blank is cut off from its end of proper size to form a hose band, such short strip or blank will be fed successively over the several male and female dies hereinbefore described by the following mechanism: The bed plate 20 is provided not only with the ribs 90 between which the female dies will be held, but is provided also at its right and left hand sides with the upstanding ribs 210 and 211, (see Figs. 1, 5 and 6). At the front and back of the machine, the ribs 210 and 211 are higher than the adjacent central portion of the machine and between the raised front and back portions of the ribs 210 and 211 extend the plates 212 and 213 that are bolted to the raised end portions of the ribs, as at 215 (see Fig. 2). Over the chamber formed at the right hand side of the bed plate of the machine by the ribs 90, the rib 210 and the plate 212, and similarly over the chamber formed at the left hand side of the machine by the corresponding rib 90, the rib 211 and the plate 213 extend the covers 216 and 217 that are connected, as by bolts 218 to the raised front and back portions of the ribs 210 and 211 and to raised portions of the bed plate 20 formed integral with the end portions of the ribs 90, as shown in Fig. 10. Each of the covers 216 and 217 is provided with a depending portion 219 at its front (see Fig. 1) which sets between the raised portions of the ribs 90 and 210 and 90 and 211. Within the chambers formed at the top of the bed plate 20 are mounted the transversely movable carriages 220 and 221, the carriage 220 sliding between the ribs 90 and 210 at the right hand side of the machine, and the carriage 221 sliding between the ribs 90 and 211 at the left hand side of the machine (see Fig. 6). The carriages 220 and 221 are the same in construction and each is provided with two raised ribs 222 and 223 (see Figs. 7 and 10) and each of the carriages 220 and is provided with rearwardly extending arms 224 and 225 (see Fig. 10) that are connected together at their rear ends by a raised casting 226 through which is formed a vertical opening 227 (see Fig. 7). In the openings 227 of each of the carriages 220 and 221 extends a rocking arm 230 (see Figs. 7 and 10) that is fixed to and depends from a rock shaft 231 (see Fig. 5). This rock shaft 231 is journaled in bearings 232 that rise from the top of the covers 216 and 217 (see Fig. 5), these covers being provided with the raised flanges 216$^a$ and 217$^a$ that extend from front to rear of the covers (see Fig. 4). From this construction it will be seen that when oscillation is imparted to the rock shaft 231 (by mechanism to be presently described), a corresponding rocking movement will be imparted to the arms 230 and a transverse sliding movement will be given by said arms 230 to the carriages 220 and 221. To the left hand end of the rock shaft 231 is fixed a crank arm 235 (see Figs. 1, 2 and 3) and to this crank arm 235 is pivotally connected, as at 236, a rod 237. The upper end of this rod 237 is preferably formed with a threaded end that enters a threaded opening formed in the depending portion of a yoke formed in the arms of which yoke straddle the 238, the arms of which yoke straddle the main shaft 22, as clearly shown in Figs. 1 and 3 of the drawings. From the yoke 238 projects a pin or stud 240 (see Figs. 1 and 3) that is held in position upon the yoke by a set screw 241 upon which is held the roller 240$^a$ guided in the cam-way 242 formed in the face of the cam disk 31 mounted upon the drive shaft 22. Hence, it will be seen that as the drive shaft 22 is rotated, the roller 240$^a$ will be shifted by the cam-way 242 and a reciprocating motion will be imparted to the rod 237 that will cause the oscillation of a rock shaft 231 and, through the medium of the rock arms 230 (see Fig. 7) will cause a transverse reciprocating movement of the sliding carriages 220 and 221, (see Fig. 5). Locknuts at the ends of the rod 237 enable the adjustment of this rod with respect to the parts to which it is connected to be readily effected.

Upon the carriage 220 is mounted a supplemental carriage 250 adapted to slide between the guide ribs 222 and 223 to and from the center of the table 220 and similarly upon the carriage 221 is mounted a supplemental carriage 251, (see Fig. 6). Each of the supplemental carriages 250 and 251 has journaled in its raised ends a pair of rollers 252 and 253 between the rollers of the supplemental carriage 250 extends the depending cam shaped shifter arm 254, while between the rollers of the supplemental carriage 251 extends the depending cam shaped shifter arm 255, these shifter arms being suitably connected (see Fig. 6) to the plunger head, as shown. Projecting toward the center of the bed plate from each of the carriages 250 and 251 and formed integral with the upper portions of said carriages, is a bed plate 256 that extends over the corresponding raised rib 90 of the bed plate, (see Fig. 6). To the plate 256 of the supplemental carriage 250 is attached an inwardly projecting plate 258 and to the plate 256 or the supplemental carriage 251 is similarly connected an inwardly projecting plate 259. These plates 258 and 259 are formed with sockets to receive the grippers whereby the severed blanks will be held as they are carried from above one female die to above the next succeeding female die. As shown, each of the plates 258 and 259 is provided with three of such grippers (see Figs. 4 and 10) that consist of plungers 260 having grooves or seats in their outer ends to engage the ends of the blanks, and the stem 261 of each of the plungers 260 is encircled by a coiled spring 262 that serves to force the plunger 260 inward. The plungers 260 are retained in position by a plate 265 that extends over them and is attached to the plate 256 of the corresponding supplemental carriage, and this plate 265 has a downwardly turned flange 266 that enters a notch 267 in the head of each of the plungers 260 (see Fig. 10) and limits the movement of the plungers. The plungers sustained by the supplemental carriage 250 are arranged opposite the corresponding plungers supported by the supplemental carriage 251, as clearly shown in Fig. 10 of the drawings.

From the foregoing description it will be seen that when the strip R is fed into the machine, in manner before described, it will be first advanced to the position shown by full lines in Fig. 10. At such point, the end portion of the strip will be cut and punched by the first set of dies hereinbefore described. As the plunger head carrying the male dies descends to effect the severing and punching of the blanks, the shoulders 254$^a$ and 255$^a$ of the cam shaped shifter arms 254 and 255 will contact with the rollers 252 of the supplemental carriages 250 and 251 and will move these carriages outwardly so as to withdraw the grippers 260 from engagement with the blanks or strips and in readiness to engage the ends of other blanks or strips. As soon as the supplemental carriages 250 and 251 are thus shifted, the rotation of the shaft 222 and the rotation of the cam plate 31 on the shaft 22 (see Figs. 1 and 3) will cause the turning of the rock shaft 231 and will thereby cause the rock arms 230 to move the transversely sliding carriages 220 and 221 from the positions shown by full lines to the positions shown by dotted lines in Fig. 10 of the drawings. After the feeding operation, and as the plunger head carrying the male dies returns toward the elevated position shown in Fig. 6 of the drawings, the shoulders 254$^b$ and 255$^b$ of the shifter arms 254 and 255 will, as they rise, contact with the rollers 253 of the supplemental carriages 250 and 251 and will shift these supplemental carriages to the positions shown by full lines in Figs. 6 and 10 of the drawings. The result of this inward shift of the supplemental carriages 250 and 251 will be to cause the plungers 260 to move inward to the positions shown in Figs. 6 and 10, and to engage the ends of the short strips or blanks R'. The plungers 260 and the plates carrying them move in a plane slightly above the plane of travel of the metal strip R (see Figs. 5 and 10) and when a short strip or blank is severed from the main strip R, it will be lifted above the plane of the main strip R to a horizontal plane opposite the seats or notches in the ends of the plungers 260, so that, as these plungers are moved inward, in manner just described, they will engage the ends of the severed strip. As the plunger head carrying the male dies completes its upward movement, a reverse rocking movement of the shaft 231 will be effected by the cam plate 31 on the main shaft 22, thereby causing the rocking arms 230 to move the transversely sliding carriages 220 and 221 toward the front of the machine. This movement of the sliding carriages 220 and 221 toward the front of the machine will bring the short strip or blank R' that was operated upon by the first set of dies in position to be operated upon by the second set of dies, and in like manner this movement of the sliding carriages will successively advance the short strips or blanks transversely of the machine and across the series of dies. As each blank is bent to form a finished hose band shown in Fig. 18 of the drawings, it will be ejected from the machine into a suitable receptacle by the mechanism hereinbefore described.

While I have described what I regard as the preferred embodiment of my invention, I wish it distinctly understood that the details of construction above set out may be varied within wide limits without departing from the scope of the invention and that features of the invention may be employed without its adoption as an entirety.

Having thus described my invention, what I claim as new and desire to secure by Letters Patent, is:—

1. An apparatus of the character described comprising a combination of feeding mechanism for advancing a metal strip, means for severing said strip into blanks, a plurality of forming dies for shaping said blanks and means for advancing the blanks widthwise from one to another of said dies.

2. An apparatus of the character described, comprising a combination of feeding mechanism for advancing a metal strip lengthwise, means for severing said strip into blanks, a plurality of male and female dies arranged to operate simultaneously upon several blanks, said dies serving to cut and bend a tongue from each of said blanks and to impart to said blanks a circular form, and means for shifting the blank widthwise from one to another of said dies.

3. An apparatus of the character described, comprising a combination of feeding mechanism for advancing a metal strip lengthwise, means for severing said strip into blanks, a plurality of dies arranged horizontally and side by side at one side of the path of travel of the strip, and means for successively advancing the blanks transversely to the path of travel of the strip and widthwise in horizontal direction over the several dies.

4. In apparatus of the character described, the combination of suitable dies, means for feeding a metal strip to said dies, a reciprocating feed plate provided with a pawl for engaging the strip, a rack connected to said feed plate, a pinion engaging said rack and means for alternately imparting partial back and forth revolutions to said pinion.

5. In apparatus of the character described, the combination with suitable dies of means for feeding a metal strip to said dies, comprising a reciprocating feed plate provided with a plurality of spring actuated pawls for engaging said strip, connections between said pawls, means for alternately reciprocating said feed plate in opposite directions and means for manually throwing said spring actuated pawls out of engagement with said strip.

6. In apparatus of the character described, the combination with suitable dies, of means for feeding a metal strip to said dies, comprising a reciprocating feed plate, pivoted depending pawl carriers on said feed plate, springs connected to said pawl carriers and pawls adjustable in said pawl carriers for engaging said strip.

7. In apparatus of the character described, the combination with suitable dies, of a pawl carrying feed plate for feeding a metal strip to said dies, means for alternately advancing and retracting said feed plate a distance corresponding to the length of the blank to be severed from the strip and an independent pivoted dogging pawl arranged to engage said metal strip and held against backward movement as the feed plate is retracted.

8. In apparatus of the character described, the combination with a plurality of sets of dies arranged for simultaneously operating upon separate blanks, of means for feeding blanks from one set of dies to another set, comprising gripping devices for engaging the blanks, supporting means for said gripping devices and means for reciprocating said gripping devices back and forth to successively deliver the blanks to said dies.

9. In apparatus of the character described, the combination with a plurality of sets of dies, of means for feeding blanks from one set of dies to another set comprising reciprocating pairs of plungers, the plungers of each pair engaging the opposite ends of a blank, means for shifting said plungers into and out of engagement with said blanks and carriage mechanism for shifting said plungers back and forth with respect to said dies.

10. In apparatus of the character described, the combination with a plurality of sets of dies, of means for feeding blanks from one set of dies to another set, comprising reciprocating plungers arranged at opposite sides of said dies to engage the blanks, means for moving said plungers back and forth to grip and release the blanks and carriage mechanism for shifting said plungers transversely with respect to said dies.

11. In apparatus of the character described, the combination with a plurality of sets of dies arranged side by side, of means for feeding blanks from one set of dies to another set, comprising a plurality of plungers arranged at the ends of said dies, a supplemental carriage at the ends of said dies for supporting the plungers, a reciprocating carriage at each end of the dies whereon the corresponding supplemental carriage is mounted and means for reciprocating said carriages and supplemental carriages at right angles to each other.

12. In apparatus of the character described, the combination of a plurality of sets of dies arranged side by side, of means for feeding blanks from one set of dies to another set comprising gripping devices arranged at opposite ends of the dies, means for supporting and shifting said gripping devices back and forth with respect to the dies, and means for shifting said gripping devices to alternately grip and release the ends of the blanks.

13. In apparatus of the character described, the combination of a plurality of sets of dies arranged side by side, of means for feeding blanks from one set of dies to another set comprising pairs, gripping devices for engaging the opposite ends of the blanks, carriage mechanism for supporting said gripping devices, a rock shaft for reciprocating said carriage mechanism, and cam mechanism for actuating said rock shaft.

14. In apparatus of the character described, the combination with male and female dies, of a spring-actuated plunger located within the female die for bending upwardly a part of the metal forced down by the male die.

15. In an apparatus of the character described, the combination with a female die having an inclined wall, of a male die having a laterally movable member operated by said wall for bending an upturned part of a blank between said dies.

16. In an apparatus of the character described, the combination with a female die, of a male die having a laterally movable member for bending an upturned part of a blank between said dies, means on said female die for moving said member laterally, and spring mechanism for restoring said movable member to normal position.

17. In an apparatus of the character described, the combinatiton of a set of male and female dies adapted to punch a metal blank and form an integral tongue thereon, and a second set of male and female dies for depressing a part of said tongue below the plane of the body of the blank and upturning the free end portion of said tongue approximately at right angles to a position above the face of said blank.

18. An apparatus of the character described comprising dies for punching a blank to form openings therein and tongue integral with the body of the blank, dies for upbending said integral tongue, dies for imparting circular bends to said blank and for curving said tongue and dies for engaging the central portion of said blank to form the same into a ring.

19. An apparatus of the character described comprising a female die having a curved depression therein, and a male die comprising a laterally projecting member to engage said die in order to form a previously shaped blank into a complete band, said member having a free end to permit the band to pass therefrom.

20. An apparatus of the character described comprising a female die having a curved depression therein, a male die comprising a laterally projecting member to engage said die in order to form a previously shaped blank into a complete band, said member having a free end to permit the band to pass therefrom, and a spring-actuated plunger in the bottom of said female die.

21. An apparatus of the character described comprising a female die having a curved depression therein, a male die having a curved depression therein, a male die comprising a laterally projecting member to engage said die in order to form a previously shaped blank into a complete band, said member having a free end to permit the band to pass therefrom, an ejector for discharging the finished band from said member, and means for actuating said ejector.

22. An apparatus of the character described comprising a female die having a curved depression therein, a male die comprising a laterally projecting member to engage said die in order to form a previously shaped blank into a complete band, said member having a free end to permit the band to pass therefrom, an ejector straddling said member, and means for actuating said ejector to discharge the finished band from said member.

HENRY GIBBS.

Witnesses:
GEO. P. FISHER,
J. G. ANDERSON.

Copies of this patent may be obtained for five cents each, by addressing the "Commissioner of Patents, Washington, D. C."